US009382741B2

(12) United States Patent
Konchan et al.

(10) Patent No.: US 9,382,741 B2

(45) Date of Patent: Jul. 5, 2016

(54) VEHICLE INCLUDING AN ASSEMBLY FOR OPENING A VEHICLE DOOR

(71) Applicant: GM GLOBAL TECHNOLOGY OPERATIONS LLC, Detroit, MI (US)

(72) Inventors: Jeffrey L. Konchan, Romeo, MI (US); Charles R. Fain, Macomb Township, MI (US); Richard J. Lange, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 16 days.

(21) Appl. No.: 14/493,544

(22) Filed: Sep. 23, 2014

(65) Prior Publication Data

US 2015/0330133 A1 Nov. 19, 2015

Related U.S. Application Data

(60) Provisional application No. 62/000,248, filed on May 19, 2014.

(51) Int. Cl.

*B60J 5/00* (2006.01)
*E05F 1/10* (2006.01)
*E05F 15/18* (2006.01)
*E05F 15/20* (2006.01)

(52) U.S. Cl.

CPC . *E05F 1/10* (2013.01); *E05F 15/18* (2013.01); *E05F 15/2076* (2013.01)

(58) Field of Classification Search

CPC .......... E05F 1/10; E05F 15/18; E05F 15/2076
See application file for complete search history.

(56) References Cited

U.S. PATENT DOCUMENTS

| | | | | |
|---|---|---|---|---|
| 3,612,601 A * | 10/1971 | Himka | B60J 5/104 | 296/106 |
| 5,898,536 A * | 4/1999 | Won | G11B 15/6751 | 360/96.51 |
| 6,406,073 B1 * | 6/2002 | Watanabe | E05B 77/265 | 292/216 |

* cited by examiner

*Primary Examiner* — Lori L Lyjak

(74) *Attorney, Agent, or Firm* — Quinn Law Group, PLLC

(57) ABSTRACT

A vehicle includes a vehicle body having a pillar, a vehicle door movably coupled to the vehicle body, and an assembly for at least partially opening the vehicle door. The assembly is coupled to the vehicle door and includes an actuator having an actuator body and an actuator shaft movable relative to the actuator body between a retracted position and an extended position. Further, the assembly includes a lever pivotally coupled to the vehicle door and a spring coupled between the lever and the actuator shaft. The spring biases the lever toward the pillar. When the vehicle door is unlatched, the lever exerts a force on the pillar and, consequently, pushes the vehicle door away from the pillar to a partially open position. The present disclosure also relates to the assembly for at least partially opening the vehicle door as described above.

20 Claims, 3 Drawing Sheets

VEHICLE INCLUDING AN ASSEMBLY FOR OPENING A VEHICLE DOOR

CROSS-REFERENCE TO RELATED APPLICATIONS

This application claims the benefit of U.S. Provisional Application No. 62/000,248, filed May 19, 2014, which is hereby incorporated by reference in its entirety.

TECHNICAL FIELD

The present disclosure relates to a vehicle including an assembly for at least partially opening a vehicle door.

BACKGROUND

Vehicles typically include a body and a door movably coupled to the body. The door usually leads to a compartment, such as a cargo or passenger compartment, and can move relative to the body between an open position and a closed position.

SUMMARY

It is useful to partially open a vehicle door from a location remote from the vehicle when, for example, the vehicle user has his hands occupied. This way, the vehicle user can partially open the vehicle door without manipulating the door handle. For instance, the vehicle user can partially open the door by pressing a button of a key fob. After partially opening the vehicle door, the vehicle user can fully open the vehicle door with ease. For example, after partially opening the vehicle door, the vehicle user can move the vehicle door from the partially open position to the fully open position without using his hands. For instance, if the vehicle user is holding items with his hands, he can use his elbow to move the vehicle door to a fully open position after the vehicle door has been partially opened. To this end, the present disclosure describes a vehicle including an assembly for at least partially opening a vehicle door.

In an embodiment, the vehicle includes a vehicle body including a pillar, a vehicle door movably coupled to the vehicle body, and an assembly for at least partially opening the vehicle door. The assembly is coupled to the vehicle door and includes an actuator having an actuator body and an actuator shaft movable relative to the actuator body between a retracted position and an extended position. Further, the assembly includes a lever pivotally coupled to the vehicle door and a spring coupled between the lever and the actuator shaft. The spring biases the lever toward the pillar. When the vehicle door is unlatched, the lever exerts a force on the pillar and, consequently, pushes the vehicle door away from the pillar to a partially open position. The present disclosure also relates to the assembly for at least partially opening the vehicle door as described above.

The above features and advantages and other features and advantages of the present teachings are readily apparent from the following detailed description of the best modes for carrying out the teachings when taken in connection with the accompanying drawings.

DETAILED DESCRIPTION

Figure 1:
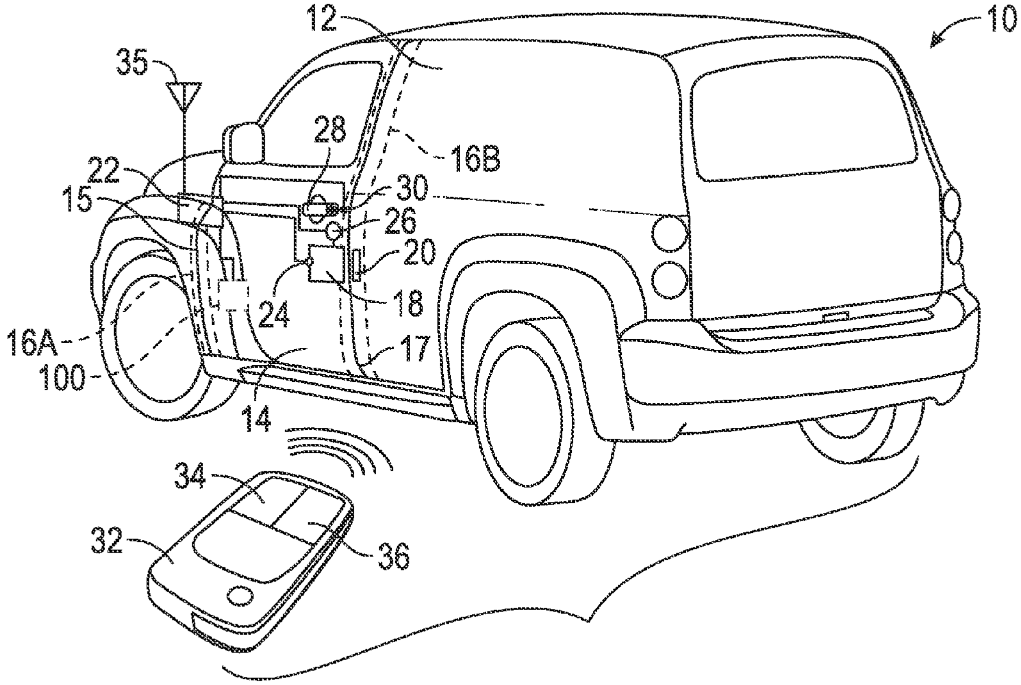
FIG. 1 is a schematic, perspective view of a vehicle including a vehicle door and a key fob for unlatching the vehicle door.

Referring to the drawings, wherein like reference numbers correspond to like or similar components throughout the several figures, FIG. 1 schematically illustrates a vehicle 10 including a vehicle body 12 and a vehicle door 14 movably coupled to the vehicle body 12. The vehicle 10 may be a land vehicle, such as a car, or any other suitable vehicle, such as a boat or an airplane. The vehicle body 12 includes a plurality of pillars 16A, 16B for enhancing the structural integrity of the vehicle 10. The pillar 16A is adjacent to the vehicle door 14 and is commonly referred to as the A-pillar. The vehicle door 14 can move relative to the vehicle body 12 between an open position and a closed position.

The vehicle 10 further includes a door latch 18 mounted within the vehicle door 14 and a striker 20 coupled to the pillar 16B (or any other part of the vehicle body 12). Alternatively, the door latch 18 may be coupled to the vehicle body 12 and the striker 20 may be coupled to the vehicle door 14. The door latch 18 can latch to the striker 20 to lock the vehicle door 14 in the closed position. Conversely, the door latch 18 can be unlatched from the striker 20 to allow the vehicle door 14 to move from the closed position toward the open position. In other words, the door latch 18 can move relative to the striker 20 between a latched position and an unlatched position. In the latched position, the door latch 18 is coupled to the striker 20, thereby latching the vehicle door 14 in the closed position. In the unlatched position, the door latch 18 is decoupled from the striker 20 and, therefore, the vehicle door 14 is free to move from the closed position to the open position. The vehicle door 14 defines a hinge end 15 and a door handle end 17. The hinge end 15 is adjacent the pillar 16A and is pivotally coupled to the vehicle body 12.

The vehicle 10 additionally includes a control module 22 in electronic communication with the door latch 18. The terms “control module,” “control,” “controller,” “control unit,” “processor” and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), sequential logic circuit(s), input/output circuit(s) and devices, appropriate signal conditioning and buffer circuitry, and other components to provide the described functionality. “Software,” “firmware,” “programs,” “instructions,” “routines,” “code,” “algorithms” and similar terms mean any controller executable instruction sets including calibrations and look-up tables. The control module 22 may be a body control module (BCM) and includes a processor and a memory in communication with the processor. The memory can store the program instructions and the processor can execute the stored program instructions. The control module 22 can receive input signals from the several sensors and is specifically programmed and configured to execute the steps of the methods 200, 300 and/or 400 as described in detail below.

The vehicle 10 includes a door sensor 24, such as an electrical switch, in communication (e.g., electronic communication) with the control module 22. The door sensor 24 is also in communication with the door latch 18 and can therefore detect whether the door latch 18 is latched to or unlatched from the striker 20. As a non-limiting example, the door sensor 24 may be an electrical switch electrically connected to the control module 22 and capable of sending an input signal to the control module 22 indicative of the position of the door latch 18 (i.e., latched position or unlatched position) with respect to the striker 20. The door sensor 24 can also detect whether the vehicle door 14 is in a fully open position or a closed position relative to the vehicle body 12 or any other position between the fully open position and the closed position. Accordingly, the door sensor 24 can generate an input signal indicative of the position of the vehicle door 14 relative to the vehicle body 12.

The vehicle 10 further includes a door latch actuator 26 in communication (e.g., electronic communication) with the control module 22. The door latch actuator 26 is coupled to the door latch 18 and, upon actuation, can move the door latch 18 with respect to the striker 20 between an unlatched position and a latched position. Specifically, in response to an output signal or command from the control module 22, the door latch actuator 26 can actuate in order to unlatch or latch the door latch 18 to the striker 20. As a non-limiting example, the door latch actuator 26 can be an electrical actuator that can be energized upon receipt of a command from the control module 22, thereby unlatching the door latch 18 from the striker 20. The door latch 18 is therefore selectively coupled to the striker 20.

The control module 22 can command the door latch actuator 26 to actuate when a vehicle user actuates (e.g., touches or lifts) a door handle 28 in order to unlatch the vehicle door 14. To this end, the vehicle 10 includes a door handle sensor 30 operatively coupled to the door handle 28 and capable of detecting if the door handle 22 has been lifted or otherwise actuated. The door handle sensor 30 is in communication (e.g., electronic communication) with the control module 22 and can generate an input signal indicative of the position of the door handle 28. For example, the door handle sensor 30 can be an electrical switch that shifts from an open position to a closed position when the door handle 28 is lifted or otherwise actuated. The input signal generated by the door handle sensor 30 is indicative of the position of the door handle 28 and can be sent to the control module 22. Upon receipt of the input signal from the door handle sensor 30, the control module 22 can command the door latch actuator 26 to actuate in order to unlatch the door latch 18 from the striker 20, thereby unlatching the vehicle door 14.

In addition, the vehicle 10 includes a remote keyless entry fob 32 for authorizing entry to the vehicle 10. The fob 32 contains a radio frequency transmitter that communicates with an antenna 35 connected to the control module 22. The fob 32 has a first unlatch button 34 for unlatching the one vehicle door 14 and a second unlatch button 36 for unlatching another vehicle door 14. In operation, the door latch 18 is latched to the striker 20. When the vehicle user approaches the vehicle 10 from a distance, the vehicle user can push either the first or second unlatch button 34, 36 of the fob 32 in order to send an unlatch signal to the control module 22 in order to unlatch one of the vehicle doors 14. Upon receipt of an unlatch signal from the fob 32, the control module 22 automatically energizes the door latch actuator 26 in order to unlatch the door latch 18 from the striker 20, thereby unlatching the vehicle door 14 from the vehicle body 12. In addition to unlatching, actuating the buttons 34, 36 may partially open the vehicle door 14. The fob 32 may have additional buttons to open additional doors. Alternatively or additionally, an interior or exterior release control can be provided to unlatch the vehicle door 14 and/or move the vehicle door 14 to a partially open position.

Figure 2:
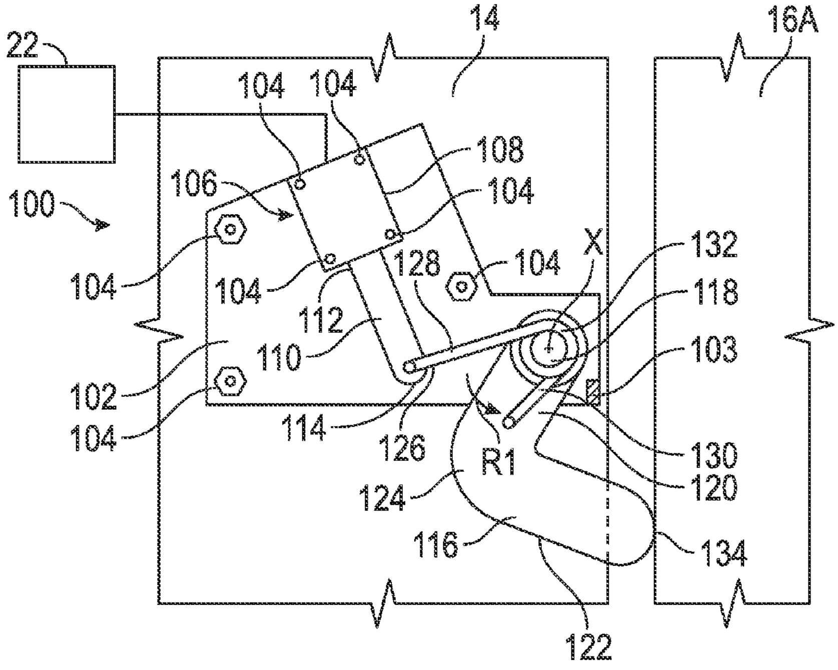
FIG. 2 is a schematic, plan view of an assembly for opening a vehicle door shown in FIG. 1, showing a lever of an assembly in a pressuring position, and the vehicle door in a closed position.

FIG. 2 schematically illustrates an assembly 100 for at least partially opening the vehicle door 14. The assembly 100 is closer to the hinge end 15 (FIG. 1) than to the door handle end 17. However, the assembly 100 may be closer to the door handle end 17 than to the hinge end 15. The assembly 100 includes frame 102 partly or wholly made of a substantially rigid material, such as steel. The frame 102 is coupled to the vehicle door 14 such that the frame 102 moves in unison with the vehicle door 14. In other words, the frame 102 is fixed to the vehicle door 14. In the depicted embodiment, a plurality of fasteners 104, such as bolts, couple the frame 102 to the vehicle door 14. Accordingly, the frame 102 can move along with the vehicle door 14 when the vehicle door 14 moves relative to the pillar 16A (or the vehicle body 12) between the open and closed positions. The frame 102 further includes a mechanical stop 103, such as a tab.

The assembly 100 additionally includes an actuator 106 in communication (e.g., electronic communication) with the control module 22. The control module 22 may be part of the assembly 100 and can control the operation of the actuator 106. The actuator 106 includes an actuator body 108 coupled to the frame 102. Therefore, the actuator 106 can move in unison with the vehicle door 14. A plurality of fasteners 104, such as screws or bolts, couples the actuator body 108 to the frame 102. Consequently, the actuator 106 can move along with the vehicle door 14 when the vehicle door 14 moves relative to the pillar 16A (or the vehicle body 12) between the open and closed positions.

Figure 4:
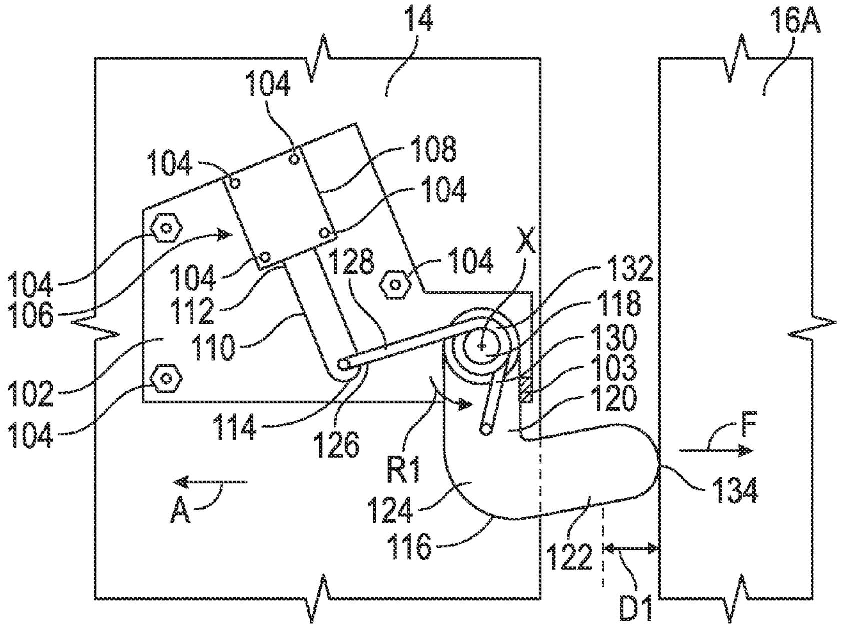
FIG. 4 is a schematic, plan view of the assembly shown in FIG. 2, showing the lever of the assembly in a fully extended position, and the vehicle door in a partially open position.

The actuator 106 also includes an actuator shaft 110 movably coupled to the actuator body 108. The actuator shaft 110 can move linearly relative to the actuator body 108 between an extended position (FIG. 2) and a retracted position (FIG. 4). The actuator shaft 110 defines a first shaft end 112 and a second shaft end 114 opposite to the first shaft end 112. The second shaft end 114 is farther from the actuator body 108 when the actuator shaft 110 is in the extended position than when the actuator shaft 110 is in the refracted position. During the operation of the actuator 106, the actuator shaft 110 can move relative to the actuator body 108 between the extended position (FIG. 2) and the retracted position (FIG. 4) upon receipt of a command from the control module 22.

The assembly 100 further includes a lever 116 and a spring 126 coupled between the actuator shaft 110 and the lever 116.

The lever 116 is movably coupled to the frame 102 and the vehicle door 14. For instance, a pivot pin 118 can couple the lever 116 to the frame 102 and the vehicle door 14. As a consequence, the lever 116 can be pivotally coupled to the frame 102 and the vehicle door 14. In the depicted embodiment, the lever 116 has a substantially L-shape and includes a first lever portion 120, a second lever portion 122, and an elbow 124 interconnecting the first and second lever portions 120, 122. The first lever portion 120 is substantially perpendicular to the second lever portion 122. The pivot pin 118 can directly couple the first lever portion 120 of the lever 116 to the frame 102 and the vehicle door 14. The pivot pin 118 defines an axis of rotation X. It is contemplated that the lever 116 can movably couple to the vehicle body 12 and can push against the vehicle door 14.

In the depicted embodiment, the spring 126 is a torsion spring and includes a first leg 128, a second leg 130, and a helical portion 132 interconnecting the first and second legs 128, 130. The spring 126 is partially wound around the pivot pin 118. In particular, the helical portion 132 is wound around the pivot pin 118. The first leg 128 is directly coupled to the actuator shaft 110 at a location closer to the second shaft end 114 than to the first shaft end 112. The second leg 130 is directly coupled to the lever 116 at the first lever portion 120. Because the spring 126 is operatively coupled between the lever 116 and the actuator shaft 110, the spring 126 biases the lever 116 to rotate about the axis of rotation X in the first rotational direction R1. Accordingly, the spring 126 urges the lever 116 to rotate in the first rotational direction R1 relative to the pillar 16A.

The lever 116 defines a lever edge 134 at the second lever portion 122. The lever 116 is in contact with the pillar 16A at least when the lever 116 is in a pressuring position as shown in FIG. 2. In the pressuring position, the lever 116 directly or indirectly exerts pressure against the pillar 16A. For instance, the lever 116 is in direct contact with the pillar 16A when located in the pressuring position (FIG. 2). When the lever 116 is in the pressuring position, the pillar 16A serves as a mechanical stop and precludes the lever 116 from rotating further in the first rotational direction R1 under the influence of the spring 126. In FIG. 2, the vehicle door 14 is latched to vehicle body 12 by the door latch 18 (FIG. 1) and, accordingly, the position of the vehicle door 14 is fixed in relation to the pillar 16A. Because the lever 116 is coupled to the vehicle door 14, the spring 126 cannot urge the lever 116 to rotate in the first rotational direction R1 in order to move the vehicle door 14 away from the pillar 16A when the vehicle door 14 is latched to the vehicle body 12.

Figure 3:
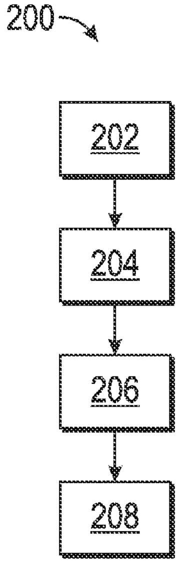
FIG. 3 is a flowchart of a method for at least partially opening the vehicle door shown in FIG. 1 using the assembly shown in FIG. 2.
Figure 5:
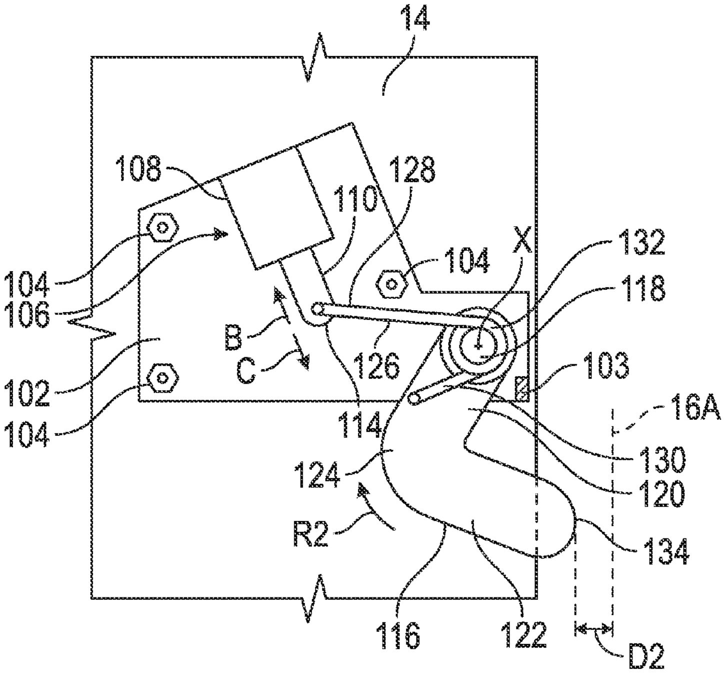
FIG. 5 is a schematic, plan view of the assembly shown in FIG. 2, showing the lever of the assembly in a fully retracted position, and the vehicle door in a fully open position.

FIG. 3 is a flowchart of a method 200 for at least partially opening the vehicle door 14, while FIGS. 2, 4, and 5 schematically illustrate the assembly 100 at different steps of the method 200. The method 200 begins with step 202, which is schematically shown in FIG. 2. Step 202 entails maintaining the lever 116 pressed against the pillar 16A using the spring 126 while the vehicle door 14 is in the closed position, the actuator shaft 110 is in the extended position, and the door latch 18 (FIG. 1) is coupled to the striker 20, thereby latching the vehicle door 14 to the vehicle body 12 in the closed position. When the lever 116 is in the pressuring position as shown in FIG. 2, the lever edge 134 abuts the pillar 16A. In step 202, the spring 126 (e.g., torsion springs) exerts a force on the lever 116 in the first rotational direction R1 (FIG. 4) and, consequently, maintains the lever 116 pressed against the pillar 16A. Because the vehicle door 14 is latched to the vehicle body 12, the lever 116 cannot rotate about the axis of rotation X in the first rotational direction R1 under the influence of the spring 126. Therefore, when the vehicle door 14 is latched to the vehicle body 12 (e.g., pillar 16A), the lever 116 cannot push the vehicle door 14 away from the pillar 16A in the direction indicated by arrow A (FIG. 4). In step 202, the spring 126 is in the loaded state and stores potential energy. Further, in step 202, the spring 126 is at least partially wound around the pivot pin 118 in order to bias the lever edge 134 toward the pillar 16A. The method 200 then continues to step 204.

Step 204 entails unlatching the vehicle door 14 from the vehicle body 12 (e.g., pillar 16A), causing the spring 126 to urge the lever 116 to rotate in the first rotational direction R1 toward a fully extended position (FIG. 4). To unlatch the vehicle door 14 from the vehicle body 12, the control module 22 can command the door latch actuator 26 to actuate in order to unlatch the door latch 18 from the striker 20. As discussed above, when the vehicle user pushes the unlatch button 34 of the fob 32, the fob 32 sends an unlatch signal to the control module 22, thereby informing the control module 22 that the vehicle user is authorized to enter the vehicle 10. Upon receipt of an unlatch signal from the fob 32, the control module 22 automatically energizes the door latch actuator 26 in order to unlatch the door latch 18 from the striker 20. In other words, the control module 22 is programmed to command the door latch 18 to unlatch from the striker 20 upon receipt of an unlatch signal from, for example, the fob 32. When the door latch 18 unlatches from the striker 20, the vehicle door 14 is unlatched from the vehicle body 12 (e.g., pillar 16A). Thus, the vehicle door 14 can move away from the vehicle body 12 (e.g., pillar 16A) when the door latch 18 is decoupled (i.e., unlatched) from the striker 20. At this juncture, the spring 126 shifts from its loaded state to its unloaded state (i.e., initial spring position) and urges the lever 116 to rotate about the axis of rotation X in the first rotational direction R1 while the actuator shaft 110 remains in its extended position. In other words, the spring 126 converts the stored potential energy into kinetic energy, causing the lever 116 to exert a force F against the pillar 16A. As a result, the lever 116 rotates in the first rotational direction R1 until it contacts the mechanical stop 103. The mechanical stop 103 precludes further movement of the lever 116 in the first rotational direction R1.

Because the lever 116 is coupled to the vehicle door 14, the vehicle door 14 moves away from the pillar 16A in the direction indicated by arrow A as the lever 116 rotates in the first rotational direction R1 when the vehicle door 14 is unlatched from the vehicle body 12 (e.g., pillar 16A). Because the mechanical stop 103 limits the movement of the lever 116, the vehicle door 14 only moves to a partially open position (FIG. 4) relative to the pillar 16A. In particular, when the lever 116 reaches the fully extended position and contacts the mechanical stop 103, the vehicle door 14 is spaced from the pillar 16A a predetermined distance D1. The predetermined distance D1 may be, for example, about 10 millimeters. Because the assembly 100 is closer to the hinge end 15 than to the door handle end 17, moving the vehicle door 14 away from the pillar 16A a predetermined distance D1 at or near the hinge end 15 causes the vehicle door 14 to be spaced from the vehicle body 12 an even greater distance (i.e., a distance greater than the predetermined distance D1) at the door handle end 17. For example, if the predetermined distance D1 is about 10 millimeters, then the distance between the vehicle door 14 and the vehicle body 12 (i.e., pillar 16B) at the door handle end 17 is greater than the predetermined distance D1 at the or near the hinge end 15. The distance between the door handle end 17 and the vehicle body 12 may be, for instance, about 100 millimeters when the lever 116 is at the fully extended position shown in FIG. 2. Thus, when the lever 116 reaches the fully extended position, the vehicle door 14 is in the partially open position.

When the vehicle door 14 is partially open with respect to the vehicle body 12, a user can then move the vehicle door 14 to a fully open position (FIG. 5) relative to the vehicle body 12. It is useful to move the vehicle door 14 to the partially open position to allow the vehicle user to subsequently move the vehicle door 14 toward the fully open position (FIG. 4) with her elbow, for example, while her hands are occupied. On the other hand, in step 204, the vehicle user can immediately move the vehicle door 14 from the partially open position (FIG. 4) to the closed position (FIG. 2) in order to wind back up the spring 126 without the need to forcefully moving the actuator shaft 110. Because the actuator shaft 110 is in the extended position when the vehicle door 14 is in the partially open position, pushing the vehicle door 14 from the partially open position to the closed position does not subject the actuator 106 to inordinate stress levels. Rather, the spring 126 shifts to its loaded state when the vehicle door 14 is moved from the partially open position to the closed position. Once the vehicle door 14 is in the partially open position (FIG. 4), the method 200 continues to step 206.

Step 206 entails moving the actuator shaft 110 from the extended position (FIG. 4) to the retracted position (FIG. 5) after the control module 22 receives an input signal from the door sensor 24 indicating that the vehicle door 14 is in a fully unlatched position. The door sensor 24 may be referred as a door latch sensor. The control module 22 can receive the input signal from the door sensor 24 and determine whether the vehicle door 14 is in a fully unlatched position. Upon receipt of the input signal from the door sensor 24, the control module 22 can command the actuator 106 to move the actuator shaft 110 linearly from the extended position to the retracted position after determining that the vehicle door 14 is in a fully unlatched position or after a predetermined amount of time has passed since the control module 22 received the input signal from the door sensor 24. In response to the command from the control module 22, the actuator shaft 110 moves linearly relative to the actuator body 108 from the extended position (FIG. 4) to the retracted position (FIG. 5) in the direction indicated by arrow B. Moving the actuator shaft 110 to the retracted position causes the spring 126 to shift to its unloaded state (i.e., initial spring position). As a consequence, the spring 126 pulls the lever 116, causing the lever 116 to rotate about the axis of rotation X in the second rotational direction R2 until the lever 116 reaches a fully retracted position. The second rotational direction R2 is opposite the first rotational direction R1 (FIG. 4).

The vehicle user can then move the vehicle door 14 toward the closed position (FIG. 2). When the vehicle door 14 is moved to the closed position, the lever 116 is still fully retracted and is spaced apart from the pillar 16A. In FIG. 5, the pillar 16A is represented by dashed lines, and FIG. 5 illustrates a distance D2 from the lever edge 134 of the lever 116 to the pillar 16A when the vehicle door 14 is in the closed position and the lever 116 is in the fully retracted position. Accordingly, when the lever 116 is in the fully retracted position, the lever edge 134 (or any other part of the lever 116) does not contact the pillar 16A when the vehicle door 14 closes in order to facilitate closing the vehicle door 14. The method 200 then proceeds to step 208.

Step 208 entails moving the actuator shaft 110 from the retracted position (FIG. 5) to the extended position (FIG. 2) after the vehicle door 14 is in the closed position. To do so, the door sensor 24 generates and sends an input signal to the control module 22 indicative of whether the vehicle door 14 is in the closed position. The control module 22 then determines that the vehicle door 14 is in the closed position based, at least in part, on an input signal from the door sensor 24. Then, the control module 22 commands the actuator 106 to move the actuator shaft 110 from the retracted position (FIG. 5) to the extended position (FIG. 2) in the direction indicated by arrow C. Moving the actuator shaft 110 from the retracted position (FIG. 5) to the extended position (FIG. 2) causes the lever 116 to rotate about the axis of rotation X in the direction indicated by arrow R1 (FIG. 2) under the influence of the spring 126. The lever 116 rotates about the axis of rotation X until the lever 116 abuts the pillar 16A as shown in FIG. 2. In other words, moving the actuator shaft 110 to the extended position (FIG. 2) causes the lever 116 to rotate in the direction indicated by arrow R1 until the lever 116 contacts the pillar 16A. The pillar 16A prevents further rotation of the lever 116.

Figure 6:
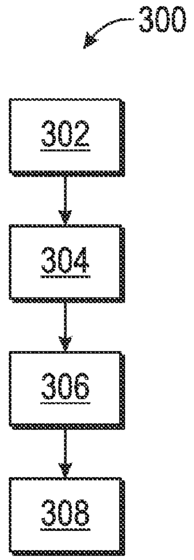
FIG. 6 is a flowchart of another method for at least partially opening the vehicle door shown in FIG. 1 using the assembly shown in FIG. 2.

With reference to FIG. 6, the assembly 100 can alternatively be used in accordance with the method 300 for at least partially opening the vehicle door 14. The method 300 begins at step 302. In step 302, the actuator shaft 110 is in the retracted position and the lever 116 is in the fully retracted position while the vehicle door 14 is in the closed position as shown in FIG. 5. Thus, step 302 entails maintaining the actuator shaft 110 in the retracted position and, consequently, the lever 116 is in the fully retracted position as shown in FIG. 5, while the vehicle door 14 is closed with respect to the vehicle body 12. As discussed above, the control module 22 can command the actuator 106 to maintain the actuator shaft 110 in the retracted position while the vehicle door 14 is in the closed position in order to maintain the lever 116 in the fully retracted position. In the fully retracted position, the lever 116 is spaced apart from the pillar 16A even when the vehicle door 14 is in the closed position. Thus, in step 302, the control module 22 commands the actuator 106 to maintain the actuator shaft 110 in the retracted position while the vehicle door 14 is in the closed position in order to maintain the lever 116 spaced apart from the pillar 16A. When the lever 116 is spaced apart from the pillar 16A, no portion of the lever 116 contacts the pillar 16A. The method 300 then continues to step 304.

Sep 304 entails receiving, via the control module 22, an input signal from the door sensor 24 indicating that the door latch 18 is unlatched from the striker 20. In other words, the control module 22 can receive an input signal from the door sensor 24 indicating that the door latch 18 is unlatched from the striker 20. As a non-limiting example, the door latch 18 can shift from the latched position to an unlatched position when the vehicle user presses the unlatch button 36 of the fob 32. After the control module 22 receives the input signal from the door sensor 24, the method 300 proceeds to step 306.

Step 306 entails commanding the actuator 106 to move the actuator shaft 110 from the retracted position to the extended position (as shown in FIG. 4) when the control module 22 receives the input signal from the door sensor 24 indicating that the door latch 18 is in the unlatched position. In other words, upon receipt of the input signal indicating that the door latch 18 is in the unlatched position, the control module 22 commands the actuator 106 to move the actuator shaft 110 from the retracted position to the extended position as shown in FIG. 4. As discussed above, the vehicle door 14 unlatches when the door latch 18 moves from the latched position to the unlatched position. As a consequence, the spring 126 shifts from its loaded state to its unloaded state (i.e., initial spring position) and urges the lever 116 to rotate about the axis of rotation X in the first rotational direction R1 in order to partially open the vehicle door 14 as discussed in detail above. Therefore, step 306 also entails unlatching the vehicle door 14 such that the spring 126 unwinds and biases the lever 116 to rotate in the first rotational direction R1. As it rotates, the lever 116 pushes the vehicle door 14 away from the pillar 16A to a partially open position. The lever 116 stops rotating once it contacts the mechanical stop 103 as described in detail above. The method 300 then proceeds to step 308.

Step 308 entails moving the actuator shaft 110 from the extended position to the retracted position and the lever 116 from the fully extended position to the fully retracted position as shown in FIG. 5 once the vehicle door 14 is in a fully unlatched position relative to the vehicle body 12. To do so, the control module 22 can command the actuator 106 to move the actuator shaft 110 from the extended position to the retracted position upon receipt of an input signal, which originates from the door sensor 24 and is indicative that the vehicle door 14 is in a fully unlatched position, or after a predetermined amount of time has passed since the control module 22 received the input signal from the door sensor 24. As a result, the lever 116 moves from the fully extended position to the fully retracted position. As discussed above, the lever 116 is moved to the fully retracted position and the actuator shaft 110 is moved to the retracted position in order to facilitate closing the vehicle door 14 at a later time. By using the method 300, the noise and wear due to the relative motion between the lever 116 and the pillar 16A is minimized while the vehicle 10 is driven by a user.

Figure 7:
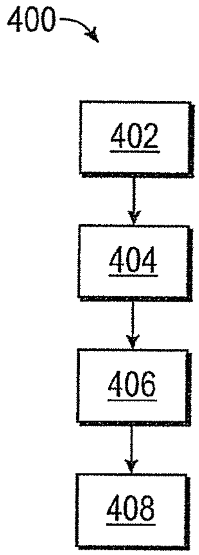
FIG. 7 is a flowchart of another method for at least partially opening the vehicle door shown in FIG. 1 using the assembly shown in FIG. 2.

With reference to FIG. 7, the assembly 100 can alternatively be used in accordance with the method 400 for at least partially opening the vehicle door 14. The method 400 begins at step 402. In step 402, the actuator shaft 110 is in the retracted position and the lever 116 is in the fully retracted position while the vehicle door 14 is in the closed position as shown in FIG. 5. Thus, step 402 entails maintaining the actuator shaft 110 in the retracted position and the lever 116 in the fully retracted position, as shown in FIG. 5, while the vehicle door 14 is closed with respect to the vehicle body 12. As discussed above, the control module 22 can command the actuator 106 to maintain the actuator shaft 110 in the retracted position while the vehicle door 14 is in the closed position in order to maintain the lever 116 in the fully retracted position. The method 400 then continues to step 404.

Step 404 entails receiving, via the control module 22, an input signal from a customer operated switch, such as the fob 32, indicating that the door latch 18 is about to unlatch from the striker 20. In other words, the control module 22 can receive an input signal from a customer operated switch, such as the fob 32.

Step 406 entails commanding the actuator 106 to move the actuator shaft 110 from the retracted position to the extended position (as shown in FIG. 4) and commanding the door latch 18 to unlatch from the striker 20 in response to the input signal received from the customer operated switch, such as the fob 32. To do so, the control module 22 can send a command signal to the actuator 106 and another command signal to the door latch actuator 26 to unlatch the door latch 18 from the striker 20. The unlatching of the door latch 18 from the striker 20 and moving the actuator shaft 110 from the retracted position to the extended position may occur simultaneously. Alternatively, the unlatching of the door latch 18 from the striker 20 and moving the actuator shaft 110 from the retracted position to the extended position do not occur at the same time. As the actuator shaft 110 moves from the retracted position to the extended position, the spring 126 winds up and stores the potential energy necessary to partially open the vehicle door 14 in the future. Furthermore, at this juncture, the spring 126 urges the lever 116 to rotate in the first rotational direction R1 until the lever 116 contacts the pillar 16A and is therefore located in the pressuring position as shown in FIG. 2. Next, the method 400 continues to step 408.

Step 408 entails moving the actuator shaft 110 from the extended position (FIG. 4) to the retracted position (FIG. 5) after the control module 22 receives an input signal from the door sensor 24 indicating that the vehicle door 14 is in a fully unlatched position. The control module 22 can receive the input signal from the door sensor 24 and determine whether the vehicle door 14 is in a fully unlatched position. Upon receipt of the input signal from the door sensor 24, the control module 22 can command the actuator 106 to move the actuator shaft 110 linearly from the extended position to the retracted position after determining that the vehicle door 14 is in a fully unlatched position or after a predetermined amount of time has passed since the control module 22 received the input signal from the door sensor 24. In response to the command from the control module 22, the actuator shaft 110 moves linearly relative to the actuator body 108 from the extended position (FIG. 4) to the retracted position (FIG. 5) in the direction indicated by arrow B. Moving the actuator shaft 110 to the retracted position causes the spring 126 to shift to its unloaded state (i.e., initial spring position). As a consequence, the spring 126 pulls the lever 116, causing the lever 116 to rotate about the axis of rotation X in the second rotational direction R2 until the lever 116 reaches a fully retracted position as shown in FIG. 5.

Figure 8:
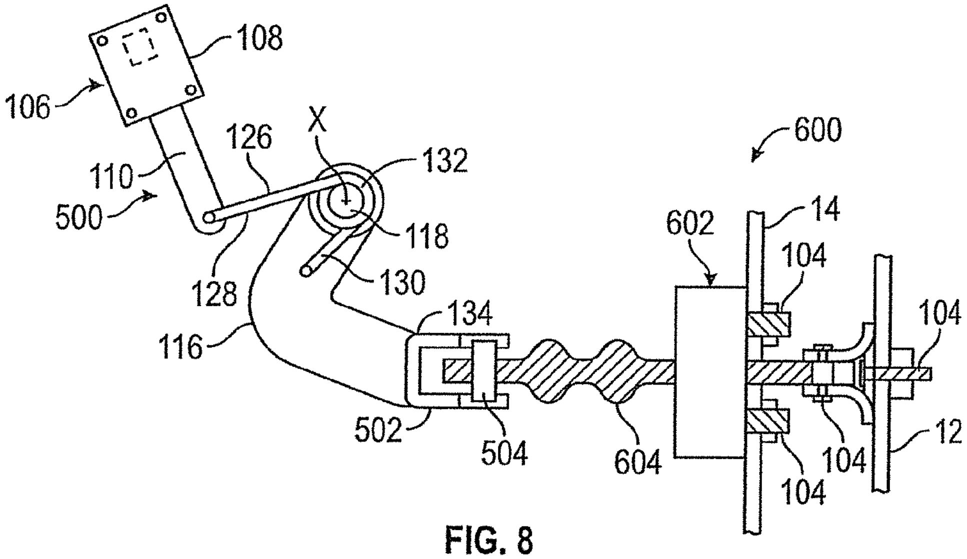
FIG. 8 is a schematic, side view of an assembly for at least partially opening a vehicle door in accordance with another embodiment of the present disclosure, wherein the assembly is coupled to a check link assembly.

FIG. 8 schematically illustrates an assembly 500 for at least partially opening the vehicle door 14 in accordance with another embodiment of the present disclosure. The structure and operation of the assembly 500 and the assembly 100 shown in FIG. 2 are substantially similar to each other, except for the features described below. In the assembly 500, the lever 116 does not directly contact the pillar 16A. Rather, the lever 116 is coupled to a check link assembly 600, which is coupled to the vehicle door 14. The check link assembly 600 limits the movement of the vehicle door 14 relative to the vehicle body 12 and includes a housing 602 and a link 604 movably coupled to the housing 602. Fasteners 104, such as bolts, couple the housing 602 to the vehicle door 14. Also, fasteners 104, such as bolts, can couple the link 604 to the vehicle body 12.

Figure 9:
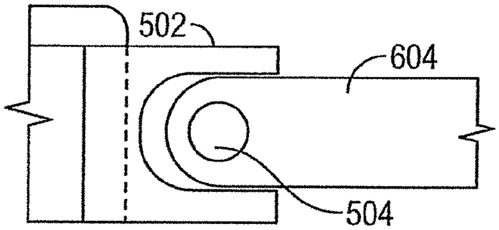
FIG. 9 is a schematic, top view of a yoke of the assembly shown in FIG. 8.
Figure 10:
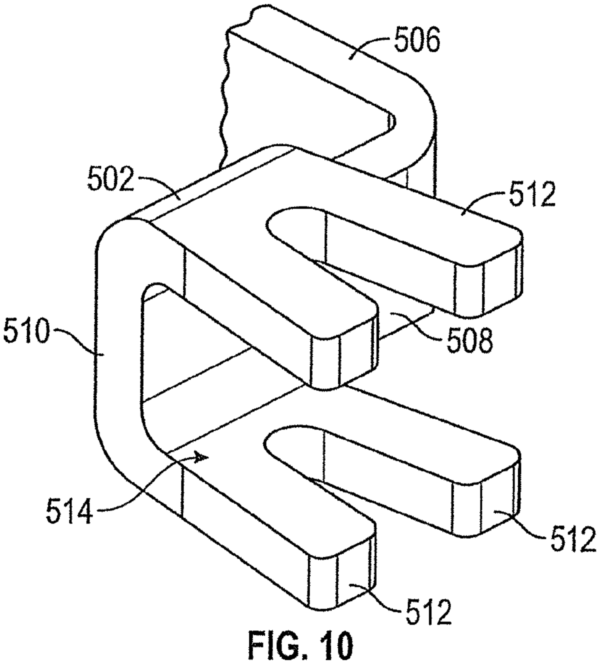
FIG. 10 is a schematic, perspective view of the yoke of the assembly shown in FIG. 8.

With reference to FIGS. 8-10, the assembly 500 includes a yoke 502 and a pin 504 coupling the lever 116 to the link 604 of the check link assembly 600. The pin 504 may be round and extends through link 604 and the yoke 502 in order to couple the lever 116 to the link 604. In the embodiment illustrated in FIG. 10, the yoke 502 includes a first yoke portion 506 and a second yoke portion 508 coupled to the first yoke portion 506. The second yoke portion 508 may be substantially perpendicular to the first yoke portion 506. Further, the yoke 502 includes a main body 510 coupled to the second yoke portion 508 and a plurality of prongs 512 protruding from the main body 510. In the depicted embodiment, the yoke 502 includes four prongs 512 spaced apart from one another so as to define a yoke opening 514. The yoke opening 514 is configured, shaped, and sized to at least partially receive the pin 504 and the link 604. The assembly 500 can be operated as described above with respect to the methods 200, 300, and/or 400. However, in the assembly 500, the lever 116 exerts a force on the link 604 (instead of the pillar 16A) in order to move the vehicle door 14 to the partially open position.

While the best modes for carrying out the teachings have been described in detail, those familiar with the art to which this disclosure relates will recognize various alternative designs and embodiments for practicing the teachings within the scope of the appended claims.

The invention claimed is:

1. A vehicle, comprising:

a vehicle body including a pillar;

a vehicle door movably coupled to the vehicle body;

an assembly coupled to the vehicle door for at least partially opening the vehicle door, wherein the assembly includes:

an actuator including an actuator body and an actuator shaft movable relative to the actuator body between a retracted position and an extended position;

a lever pivotally coupled to the vehicle door; and a spring coupled between the lever and the actuator shaft such that the spring biases the lever toward the pillar.

2. The vehicle of claim 1, further comprising a control module in communication with the actuator, wherein the control module is specifically programmed to command the actuator to move the actuator shaft relative to the actuator body between the retracted position and the extended position.

3. The vehicle of claim 2, further comprising a door latch coupled to the vehicle door and a striker coupled to the vehicle body, wherein the door latch is selectively coupled to the striker to lock the vehicle door to the vehicle body.

4. The vehicle of claim 3, further comprising a door sensor in communication with the control module and the door latch, wherein the door sensor is configured to detect whether the door latch is latched to the striker or unlatched from the striker.

5. The vehicle of claim 4, wherein the control module is programmed to command the actuator to maintain the actuator shaft in the extended position such that the spring biases the lever toward the pillar in order to maintain the lever pressed against the pillar while the vehicle door is in a closed position.

6. The vehicle of claim 5, wherein the control module is programmed to command the door latch to unlatch from the striker upon receipt of an unlatch signal, thereby allowing the lever to rotate in order to push the vehicle door away from the pillar to a partially open position.

7. The vehicle of claim 6, wherein the control module is programmed to command the actuator to move the actuator shaft from the extended position to the retracted position upon receipt of an input signal from the door sensor indicating that the vehicle door is in a fully unlatched position.

8. The vehicle of claim 7, wherein the control module is programmed to command the actuator to move the actuator shaft from the retracted position to the extended position after the control module receives an input signal from the door sensor indicating that the vehicle door is in the closed position relative to the vehicle body.

9. The vehicle of claim 4, wherein the control module is programmed to command the actuator to maintain the actuator shaft in the retracted position while the vehicle door is in the closed position in order to maintain the lever spaced apart from the pillar while the vehicle door is in the closed position relative to the vehicle body.

10. The vehicle of claim 9, wherein the control module is programmed to command the actuator to move the actuator shaft from the retracted position to the extended position upon receipt of an input signal from the door sensor indicating that the door latch is unlatched from the striker, thereby allowing the lever to exert a force against the pillar in order to move the vehicle door to a partially open position.

11. The vehicle of claim 10, wherein the control module is programmed to command the actuator to move the actuator shaft from the extended position to the refracted position upon receipt of an input signal from the door sensor indicating that the vehicle door is in a fully unlatched position.

12. The vehicle of claim 9, wherein the control module is programmed to command the actuator to move the actuator shaft from the retracted position to the extended position upon receipt of an input signal from the control module to unlatch simultaneously while the door latch is unlatching from the striker.

13. The vehicle of claim 9, wherein the control module is programmed to command the door latch to unlatch from the striker and to move the actuator shaft from the retracted position to the extended position, wherein the unlatching of the door latch and moving the actuator shaft to the extended position do not occur simultaneously.

14. The vehicle of claim 13, wherein the control module is programmed to command the actuator to move the actuator shaft from the extended position to the retracted position after a predetermined amount of time has passed since the control module received the input signal from the door sensor indicating that the vehicle door is unlatched.

15. The vehicle of claim 3, wherein the lever is pivotally coupled to the vehicle door such that the lever directly contacts the pillar in order to exert a force on the pillar when the door latch unlatches from the striker.

16. The vehicle of claim 2, further comprising a check link assembly coupled between the vehicle body and the vehicle door, wherein the lever is configured to contact the check link assembly such that the lever is configured to exert a force on the check link assembly in order to move the vehicle door to a partially open position.

17. The vehicle of claim 16, wherein the check link assembly includes a housing and a link movably coupled to the housing, and the lever is in direct contact with the link.

18. The vehicle of claim 17, further comprising a yoke interconnecting the lever and the link when the vehicle door is in the closed position.

19. A assembly for opening a vehicle door relative to a pillar of a vehicle body, the assembly comprising:

an actuator including an actuator body and an actuator shaft movable relative to the actuator body between a retracted position and an extended position;

a lever pivotally couplable between the vehicle door and the vehicle body; and a spring coupled between the lever and the actuator shaft such that the spring biases the lever toward the pillar.

20. The assembly of claim 19, further comprising a frame and a pivot pin pivotally coupling the lever to the frame, wherein the pivot pin defines an axis of rotation, and the spring is a torsion spring and is configured to urge the lever to rotate about the axis of rotation defined by the pivot pin.

* * * * *